United States Patent Office 3,036,683
Patented May 29, 1962

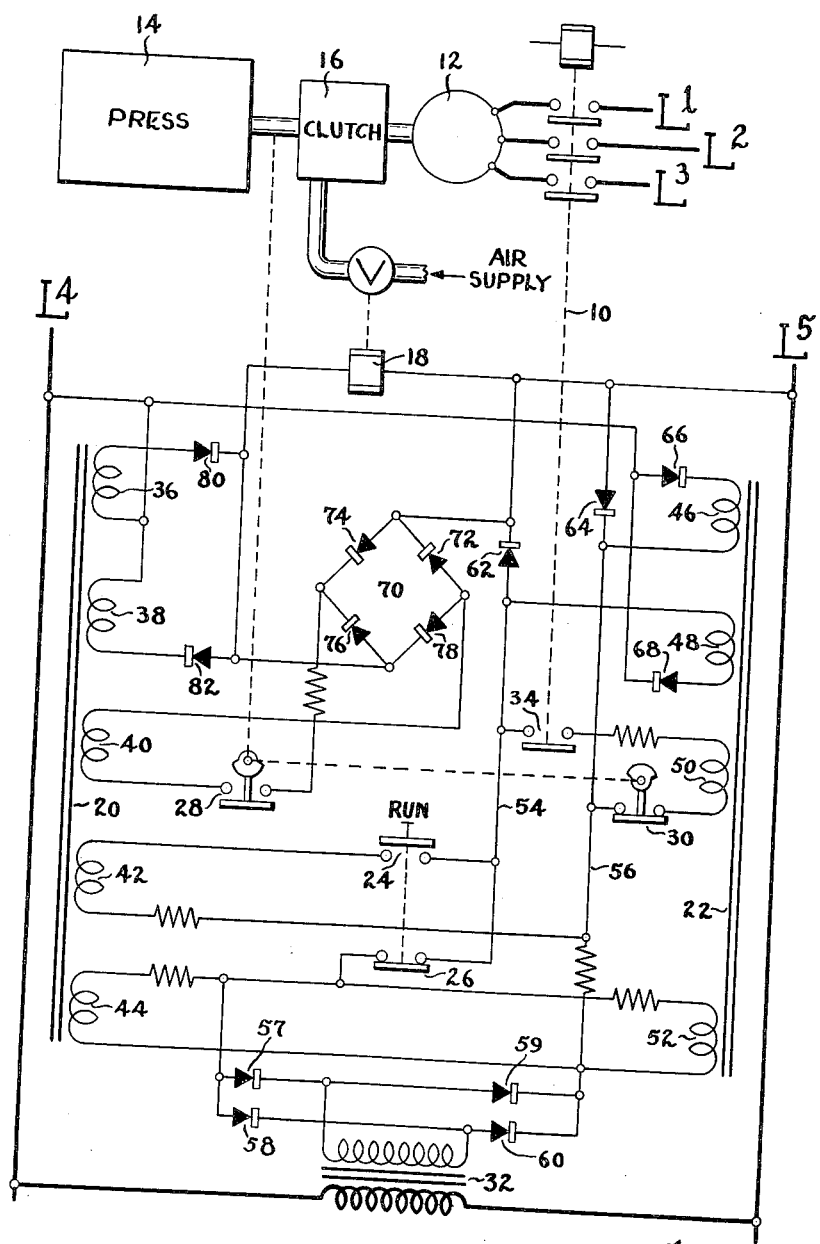

3,036,683
INTERLOCKED ELECTRIC CONTROLLERS
Paul M. Fischer and Verne H. Simson, Milwaukee, Wis., assignors to Cutler-Hammer, Inc., Milwaukee, Wis., a corporation of Delaware
Filed May 13, 1954, Ser. No. 429,586
8 Claims. (Cl. 192—142)

This invention relates to improvements in interlocked electric control circuits. In particular, it relates to improvements in controllers for effecting single-cycle or non-repeat operation of power driven machines such, for example, as power driven presses.

A primary object of the invention is to provide an improved electric controller of the interlocking type.

Another object is to provide for power driven machines, and for power presses in particular, a controller which employs a minimum number of moving components thus to minimize dangerous faults and malfunctions in the control and to permit more complete safety checking and testing of the control under static conditions.

Another object of the invention is to provide an improved controller for effecting non-repeat operation of power driven machines.

Other objects and advantages of the invention will hereinafter appear.

Certain of these objects are realized by using two saturable reactors, or magnetic amplifiers, each of which is provided with a control winding by which the reactor, after being saturated, may be maintained self-saturated, arranging one of the reactors to be capable of saturating the other and by providing a simple switching arrangement for controlling reactor saturation in relation to operation of the device to be controlled.

One embodiment of the invention is illustrated diagrammatically and schematically in the accompanying drawing which forms a part of this specification. It is to be understood that certain modifications may be made in the embodiment illustrated and that other embodiments of the invention are possible to be made without departing from the spirit of the invention or the scope of the appended claims.

In the drawing, the numeral 10 represents a switch which may be actuated to connect a power source L1, L2, L3 to a motor 12. The motor is connected to drive a press 14 through a clutch 16. The clutch 16 is engaged when the solenoid 18 of an electrically operated air valve is energized to open the valve.

The circuit which controls the energization of the solenoid 18 includes: saturable reactors 20 and 22; a Run button having a normally open contact 24 and a normally closed contact 26; limit switches 28 and 30 which are mechanically connected to the press 14; an isolating transformer 32; interlock switch means 34, represented as normally open contacts of switch 10; and a plurality of one-half wave rectifier units. Reactor 20 comprises power windings 36 and 38, a control winding 40, a control winding 42 and a bias winding 44. Reactor 22 includes power windings 46 and 48, a control winding 50 and a bias winding 52.

The primary winding of transformer 32 is connected across lines L4 and L5. The secondary winding of said transformer is connected to a full-wave bridge type rectifier comprising rectifier units 57, 58, 59 and 60. The output current of the bridge rectifier is applied to bias windings 44 and 52. The current amplitude in said windings is adjusted so that neither of the saturable reactors 20, 22 is saturated.

If switch 10 is actuated to energize motor 12 and to close contacts 34 and contacts 26 of the Run button are closed and limit switch 30 is closed, control winding 50 will be energized by bridge rectifier set 57, 59, 58, 60 through contacts 26, conductor 54, contacts 34, switch 30 and conductor 56. When energized, control winding 50 effects saturation of reactor 22 whereupon the impedance of power windings 46 and 48 is reduced. Thereafter current from lines L4 and L5 is permitted to flow in a bridge rectifier circuit including power windings 46 and 48 and half-wave rectifier units 62, 64, 66 and 68. The output of this rectifier circuit is applied to lines 54 and 56 and so is applied to control winding 50.

When the press is to be operated, switch 10 is actuated. Motor 12 is started and contacts 34 are closed and remain closed. Assuming the press to be stopped in proper position so that limit switch 30 is closed, winding 50 of reactor 22 is energized through transformer 32. Once energized, winding 50 saturates reactor 22 and power from rectifier 62, 64, 66, 68 maintains winding 50 energized even though contacts 26 of the Run button are opened.

To engage the clutch 16 and drivingly connect motor 12 to press 14, the Run button is depressed to close contacts 24. Power is applied from conductors 54 and 56 to winding 42. Thus energized, winding 42 acts to saturate the core of reactor 20 so that alternating current is permitted to flow from lines L4 and L5 through the solenoid 18; a bridge rectifier 70 comprising half-wave rectifier units 72, 74, 76 and 78; and, on respective alternate one-half cycles of the voltage at lines L4 and L5, through half-wave rectifier unit 80 and power winding 36 and through half-wave rectifier unit 82 and winding 38. Unidirectional power from bridge rectifier 70 is applied to control winding 40 through limit switch 28 when the latter is closed.

Thus operation of the Run button effects energization of solenoid 18 and clutch 16 is engaged. The limit switches are shown in the drawing in their respective positions at the beginning of the press stroke. The Run button must be held until the press moves sufficiently far so that it is safe for the operator to remove his hands from the Run button. At this point limit switch 28 closes and winding 40 is energized. Thereafter the Run button may be released because winding 40 will maintain reactor 20 saturated. When the press cycle nears completion, limit switch 28 is opened so that reactor 20 is no longer saturated and solenoid 18 will be deenergized and by suitable means (not shown) the press will be stopped in its original starting position.

The Run button must be actuated to close contacts 24 to initiate each successive operating cycle of the press. Any attempt to effect continuous operation of the press by holding the Run button will fail because current cannot flow to solenoid 18 unless reactor 20 is saturated by energization of one of control windings 40 or 42. Winding 40 is deenergized near the end of the press cycle when limit switch 28 is opened. Winding 42 can only be energized if contacts 24 are closed after reactor 22 has been saturated by energization of winding 50. Limit switch 30 is opened for an intermediate period during the press stroke while limit switch 28 is closed so that winding 50 will be deenergized. Only by releasing the Run button to close contacts 26 can winding 50 be reenergized.

We claim:

1. In combination, a first saturable reactor having an output circuit, a controlled device connected in said output circuit for operation when said first reactor is saturated, a second saturable reactor operable when saturated for affording power for controlling said first reactor, selective means, means for initiating saturation of said second reactor through said selective means in a first operating position and for maintaining saturation thereof independently of said selective means, means responsive to operation of said selective means to a second operating position while said second reactor is saturated for initiating saturation of said first reactor thereby to operate said controlled device, and control means responsive to operation of said controlled device for maintaining said first reactor saturated for a predetermined time interval independently of the last mentioned means and for interrupting saturation of said second reactor during said time interval, said control means being responsive to further operation of said controlled device for interrupting saturation of said first reactor to discontinue operation of said controlled device whereby reoperation of said selective means through said first operating position to said second operating position is required to effect another cycle of operation of the controlled device.

2. In a controller for cyclically operable power driven machines, in combination, a first and a second saturable reactor, each having a power winding affording an output voltage when its associated reactor is saturated and each having a first control winding responsive to saturation in its associated reactor to maintain said reactor saturated, said first reactor having a second control winding acting when energized to saturate said first reactor, energizing means connectable to energize said first control winding of said second reactor to saturate the latter, means to selectively disconnect said energizing means and connect said second control winding to the power winding of said second reactor to saturate said first reactor or connect said energizing means and disconnect said second control winding from the power winding of said second reactor, control means resposive to saturation of said first reactor to effect operation of the machine, and means responsive to operation of the machine to interrupt energization of each of said first control windings at respectively selected times during an operating cycle of the machine to interrupt saturation of said reactors thereby to render said control means ineffective.

3. In a controller for a cyclically operable power driven machine, electro-responsive means for effecting driving of the machine, a first saturable reactor having a power winding connected for energizing said electro-responsive means when said first reactor is saturated, said first reactor further having a first control winding in circuit with said power winding and having a second control winding, a second saturable reactor having a control winding and a power winding in circuit with its control winding and said second control winding of said first reactor, means to effect saturation of said second reactor in order to control said first reactor, means to thereafter effect saturation of said first reactor through its second control winding and to maintain saturation thereof through its first control winding, and means responsive to operation of the machine to interrupt at selected times in relation to the cyclic operation of the machine the circuit from said power winding of said second reactor to its control winding and to interrupt the circuit from the power winding of said first reactor to said first control winding thereby to deenergize said electro-responsive means.

4. In a control system for cyclically operating a controlled device, electrical means for effecting operation of the controlled device, a saturable reactor having power windings and a maintaining winding and a control winding, means for momentarily energizing said control winding to initiate saturation of said reactor whereafter the latter is maintained saturated through said maintaining winding, means comprising said power windings for energizing said electrical means to effect operation of said device when said reactor is saturated, switch means responsive to operation of said device at predetermined times during its operating cycle for rendering said control winding energizing means ineffective and for interrupting said maintaining means.

5. In a controller for cyclically operable power driven machines, in combination, first and second saturable reactors each comprising a magnetic core and a control winding for saturating said core, each of said reactors further comprising a power winding having reactance when said core is unsaturated to prevent current flow therethrough, an electro-responsive device coupled to the power winding of said first reactor for effecting operation of the machine, means for energizing the control winding of said second reactor to saturate the latter, means including said power and control windings of said second reactor for maintaining saturation of the latter independently of said energizing means, an additional control winding on said first reactor, switch means for disconnecting said energizing means and momentarily connecting said additional control winding to the power winding of said second reactor to saturate said first reactor thereby to operate said electro-responsive means and the machine, means including said power and control windings of said first reactor for maintaining the latter saturated, and limit switch means responsive to predetermined operation of the machine for interrupting energization of the first mentioned control windings to limit operation of the machine to one cycle.

6. In combination, a cyclically operable power driven machine, first and second saturable reactors each comprising a magnetic core and a control winding for saturating said core and a power winding having reactance when said core is unsaturated to prevent current flow therethrough, a source of unidirectional electrical power, an operator's switch comprising normally open and normally closed contacts, means comprising said normally closed contacts for connecting said power source to energize the control winding of said second reactor, control means comprising said normally open contacts and the power windings of said second reactor for initiating saturation of the core of said first reactor, an electro-responsive device operable in response to saturation of said first reactor for coupling driving power to said machine, a first switch responsive to operation of said machine for rendering said control means ineffective, and a second switch responsive to further operation of said machine for interrupting saturation of said first reactor thereby to automatically stop said machine at the end of one cycle.

7. In a control system for controlling the energization and de-energization of a device; a source of D.C. and a source of A.C.; mechanical switch means operated by a source of A.C.; cyclically operating mechanism at predetermined points in its cycle; operator's switch means operable and restorable at will; rectifying magnetic amplifier means arranged to receive energization from the A.C. source, and having control winding means arranged to receive energization from the D.C. source under control of the operator's switch means; the amplifier means having output circuit means connected to the device; the amplifier means constructed to respond to operation of the operator switch means to deliver output current to the device, and to respond to operation of the mechanical switch means at an intermediate point in the mechanism cycle, to continue said delivery of current to the device after restoring the operator switch means, and to respond to operation of the mechanical switch means at the end of the mechanism cycle to discontinue delivery of said current to the device.

8. In a control system for controlling the energization and de-energization of a device; rectifying magnetic amplifier means comprising power input winding means, control winding means; and output circuit means to which the device is connected; operator switch means operable and restorable at will; mechanical switch means operable by a cyclically operating mechanism at predetermined points in the mechanism cycle; the control winding means arranged to be energized upon operation of the operator switch means, and the amplifier means responding thereto to supply potential from the output circuit means to the device to energize it; the amplifier means arranged to respond to operation of the mechanical switch means, at an intermediate point in the mechanism cycle, to continue said supply of potential after restoring of the operator switch means; and the amplifier means arranged to respond to operation of the mechanical switch means at the end of the mechanism cycle to discontinue said supply of potential to deenergize the device.

References Cited in the file of this patent
UNITED STATES PATENTS

| | | |
|---|---|---|
| 2,302,838 | Bundy | Nov. 24, 1942 |
| 2,567,383 | Krabbe et al. | Sept. 11, 1951 |
| 2,585,332 | Logan | Feb. 12, 1952 |
| 2,675,507 | Geiger | Apr. 13, 1954 |
| 2,680,216 | Schmidt | June 1, 1954 |